(12) United States Patent
Giannakopoulos

(10) Patent No.: US 7,344,110 B2
(45) Date of Patent: Mar. 18, 2008

(54) AIRCRAFT WITH DETACHABLE PASSENGER ESCAPE CABIN

(76) Inventor: Pavlos Giannakopoulos, P.O. Box 3075, Patra (GR) 26005

( * ) Notice: Subject to any disclaimer, the term of this patent is extended or adjusted under 35 U.S.C. 154(b) by 242 days.

(21) Appl. No.: 11/074,242

(22) Filed: Mar. 7, 2005

(65) Prior Publication Data

US 2005/0242240 A1 Nov. 3, 2005

(30) Foreign Application Priority Data

Apr. 8, 2004 (GR) .............................. 20040100130

(51) Int. Cl.
*B64D 25/12* (2006.01)

(52) U.S. Cl. ..................................................... 244/140

(58) Field of Classification Search ................ 244/140, 244/138 R, 220, 99.2, 99.3, 99.9, 235
See application file for complete search history.

(56) References Cited

U.S. PATENT DOCUMENTS

| 4,143,841 | A | * | 3/1979 | Roeder ........................ 244/140 |
| 4,473,203 | A | * | 9/1984 | Barnoin et al. ............. 244/224 |
| 5,056,742 | A | * | 10/1991 | Sakurai ....................... 244/235 |
| 5,568,903 | A | * | 10/1996 | Pena et al. .................. 244/140 |

* cited by examiner

*Primary Examiner*—Rob Swiatek

(57) ABSTRACT

Aircraft 5 with a detachable passenger escape cabin 1 comprising detachable piloting systems, namely the center pedestal 3b, the control stick 1k, the pedals 1r as well as the upright sliding bars 1v, 1v', and 1t, 1t' between cabin 1 and opening 3 of aircraft 5 for an easy and rapid disengagement of cabin 1 from fuselage 4.

4 Claims, 2 Drawing Sheets

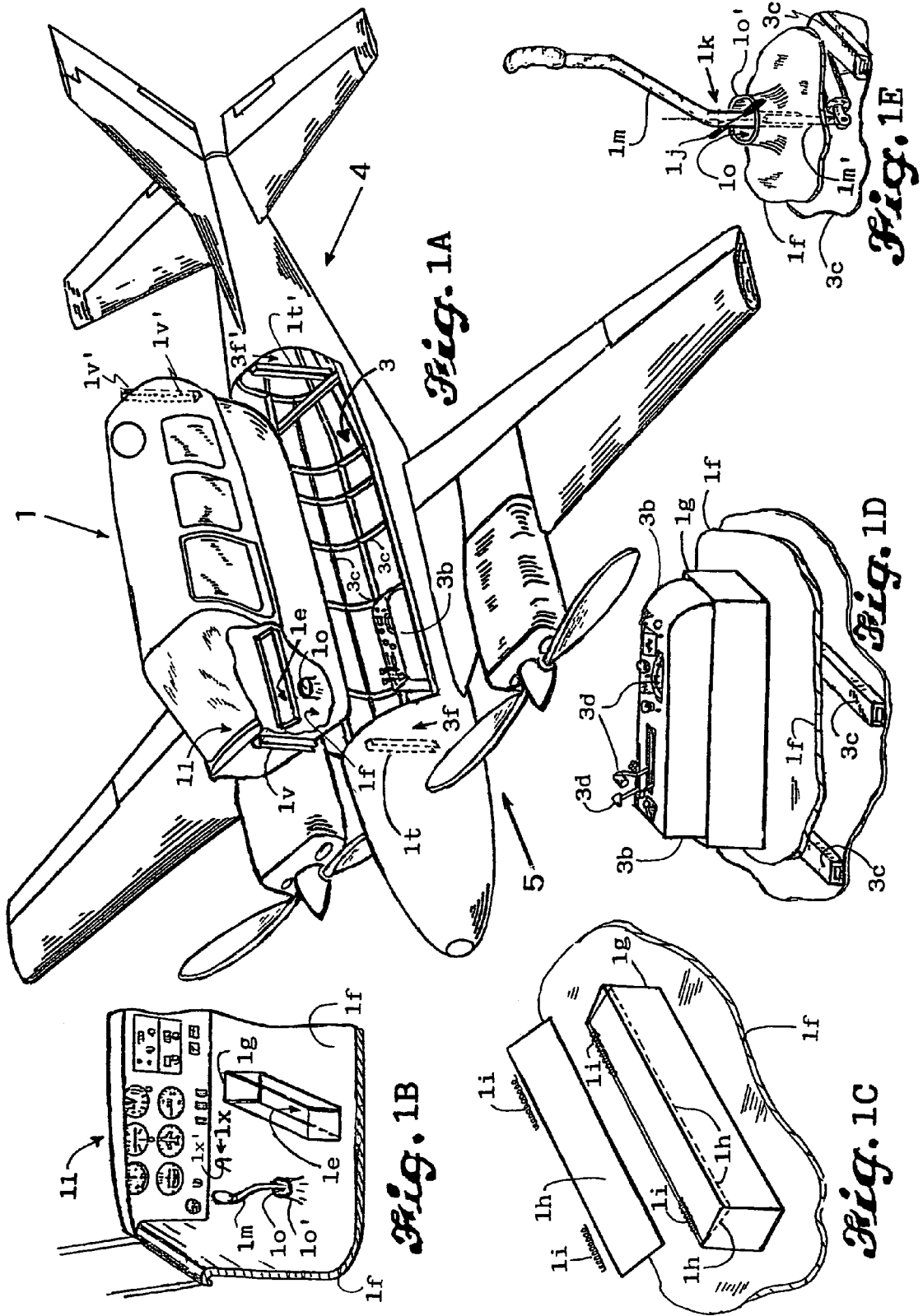

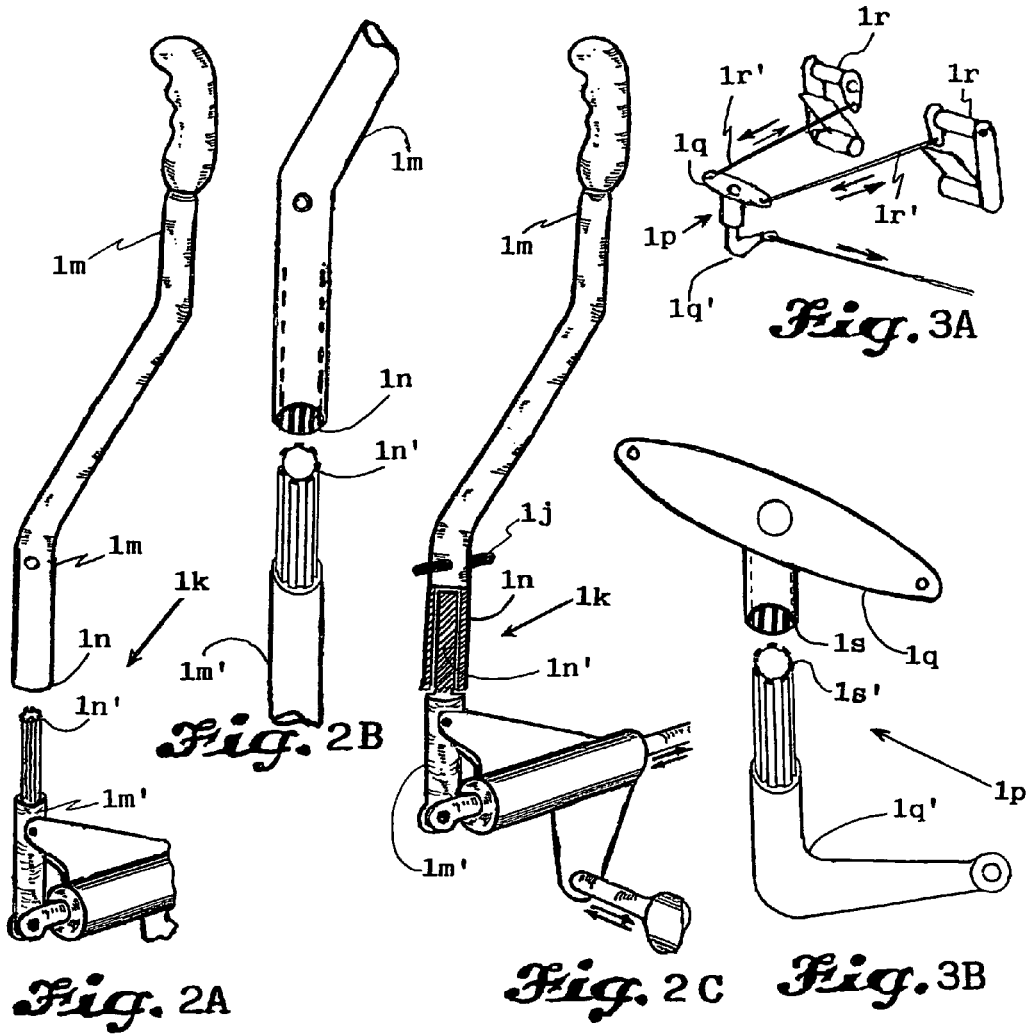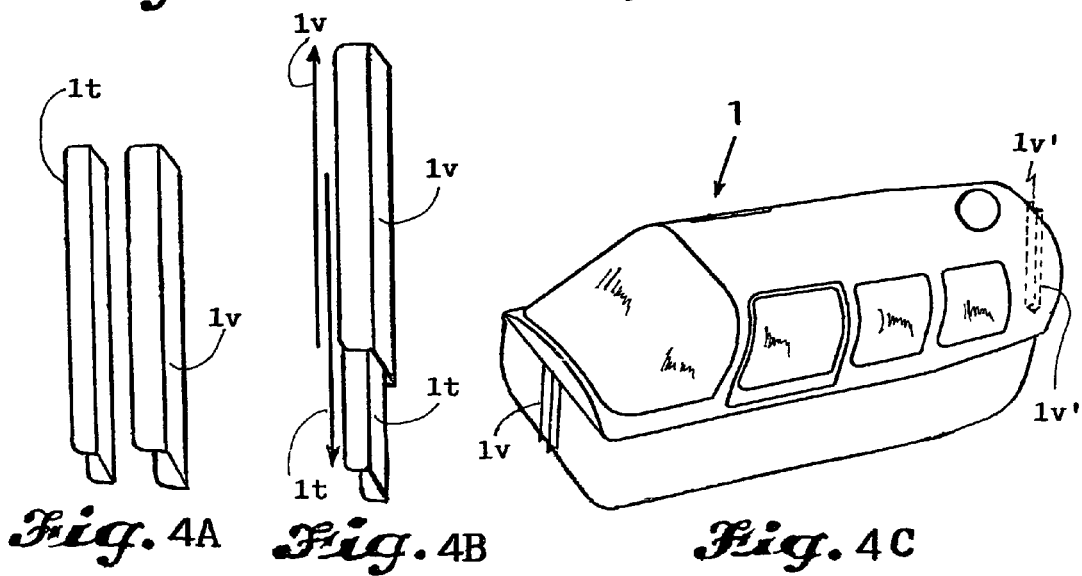

AIRCRAFT WITH DETACHABLE PASSENGER ESCAPE CABIN

BACKGROUND OF THE INVENTION

1. Field of the Invention

The invention relates to the field of the art of aircraft with emergency equipment and more specifically it relates to an aircraft comprising a detachable passenger escape cabin mounted onto the fuselage of the aircraft.

2. Description of Related Art

An aircraft with a detachable passenger escape cabin is known from granted Patents GR-1003755, EP-1,280,699, U.S. Pat. No. 6,682,017.

It is an object of the present invention to supplement the aforementioned granted patents with the presentation of the rapid sliding and the detachment of the center pedestal from the cabin bearing the throttle control lever, compensation lever, propeller pitch lever and other levers interacting with the respective control sticks in the aircraft.

It is a further object of the present invention to disclose means for the rapid detachment of the control stick and pedestals from the fuselage and the function of the sliding bars for the facilitation of the fast detachment of the cabin during its vertical, upward separation from the fuselage of the aircraft, which then falls to Earth, whereby the cabin being detached is released from all the controls and mechanisms connected to it during the piloting of the Aircraft.

BRIEF SUMMARY OF THE INVENTION

In an aircraft with a detachable passenger escape cabin, the invention proposes a mode of connection of the cabin to the fuselage of the aircraft through a system of upright, vertically aligned sliding bars cooperatively attached to said cabin and said fuselage, a center pedestal fixedly mounted to a structural frame of said aircraft inside an opening in the fuselage thereof and extending within the detachable cabin, said center pedestal being capable to move vertically downwards together with the aircraft fuselage as the cabin is detached, said cabin and the fuselage of said aircraft further comprising a detachable control stick system and a separable crankshaft system for the detachment of pedals, wherein when emergency cabin detachment conditions arise, the cabin moves in alignment with said fuselage and all openings in the floor of the cabin adapted to provide for connection of said center pedestal, detachable control stick system and separable crankshaft system for the detachment of pedals are closed inhibiting influx of water when the cabin eventually crashes onto the sea.

These and other advantages and characteristics of the present invention will be included in the herein below detailed description of preferred embodiments.

BRIEF DESCRIPTION OF DRAWINGS

FIG. 1A illustrates a perspective view of the escape cabin detached from the aircraft with openings provided on the floor of the cabin for the insertion of the center pedestal, control stick, pedals, the cabin being provided with upright sliding bars on the front and rear thereof, and the fuselage of the aircraft with the fixedly mounted center pedestal and corresponding sliding bars on the respective front and rear thereof within the opening of the fuselage.

FIG. 1B illustrates a perspective view of a portion of the cockpit with the two openings on the floor where the center pedestal and the control stick will be inserted respectively.

FIG. 1C illustrates a perspective view of a portion of the floor of the cockpit where the opening for the insertion of the center pedestal has been formed, with a rectangular elevated wall protecting from the influx of water being provided circumferentially around it, as well as a lid equipped with springs being attached longitudinally across the elevated wall.

FIG. 1D illustrates a perspective view of the portion of the floor of previous FIG. 1C fixedly mounted onto structural members of the fuselage with the center pedestal being inserted through the lower portion of the opening formed onto the floor of the cockpit.

FIG. 1E illustrates a perspective view of a portion of the floor of the cockpit of FIG. 1B after an upper bar of the control stick system has been inserted through the opening formed onto the floor of the cockpit and its detailed connection with the lower bar of the control stick system which is fixedly mounted onto a structural member of the fuselage.

FIG. 2A illustrates a perspective view of the separable control stick, disassembled and comprising two separate bars.

FIG. 2B illustrates a perspective view of a detail in the construction of the matching ends of the two bars of the separable control stick shown in previous FIG. 2A.

FIG. 2C illustrates a perspective view of a detail in the connection of the two bars of the separable control stick, with a sectional view at the point of the matching ends of the two bars shown in previous FIGS. 2A, 2B.

FIG. 3A illustrates a perspective view of the pedals in the cockpit, connected with the separable crankshaft by push-pull bars.

FIG. 3B illustrates a perspective view of the separable crankshaft of previous FIG. 3A disassembled and with a detail of its construction.

FIG. 4A illustrates a perspective view of the two upright sliding bars of U Normal Profile section, one detached from the other.

FIG. 4B illustrates a perspective view of the sliding bars of previous FIG. 4A, the bars shown in assembled condition and with a detail of their function during sliding.

FIG. 4C illustrates a perspective view of the escape cabin with one of the sliding bars of FIG. 4A attached onto the exterior front portion of the cockpit, while the other bar is attached onto the respective rear portion being shown with discontinuous lines.

BRIEF DESCRIPTION OF PREFERRED EMBODIMENTS

With reference to the accompanying drawings, we will hereinafter describe preferred embodiments of the invention.

According to the embodiment shown in FIG. 1A, the detachable cabin 1 is illustrated with a through rectangular opening 1e extending longitudinally across the floor 1f of cabin 1 between the seats of the pilot and co-pilot as shown in FIG. 1B, inside the cockpit 11.

As it can be distinguished in FIGS. 1C, 1D, an elevated protective wall 1g extends circumferentially around the shaped opening 1e, whose purpose is to prevent water from entering from the external lower portion of floor 1f through opening 1e and, successively from reaching cabin 1, when it crashes onto the sea.

This is regarded as a supplementary safety precaution as cabin 1 will be waterproof, with autonomous flotation and also with the supplementary aid of inflatable airbags.

Wall 1g will be higher than sea level when cabin 1 is floating. However, for extra safety a lid 1h will be mounted longitudinally across the elevated wall 1g, which will close automatically with the use of springs 1i and seal wall 1g when necessary and after pedestal 3b is detached. The function of lid 1h is also based on the springs whose purpose is to rotate lid 1h until it seals wall 1g internally. When pedestal 3b is inside opening 1e and surrounded by wall 1g, lid 1h is located between them in a downward angle and is under the strain of springs 1i, its surface coming into matching contact with the side of pedestal 3b which, when detached from opening 1e, allows springs 1i to automatically push lid 1h upwards until it reaches the top of wall 1g where it seals tight on the internal portion of wall 1g, not being able to move further or exit wall 1g as its width is somewhat larger than the internal width of wall 1g.

FIG. 1A illustrates pedestal 3b which is fixedly mounted onto structural members of the frame 3c of aircraft 5.

Pedestal 3b is rectangular in shape with a length larger than its width and extending along opening 3 of fuselage 4 of aircraft 5 and its dimensions are somewhat smaller than those of opening 1e.

When cabin 1 is inserted and mounted in place inside opening 3, pedestal 3b will forcefully be inserted in its place at the same time passing through through opening 1e of floor 1f of cabin 1 as illustrated in FIG. 1D and coming into matching contact with the internal surfaces of wall 1g. Pedestal 3b bears on its upper portion 3d the engine control stick, throttle lever, mixture lever, pitch lever, fuel control and fuel contents gauge, longitudinal balance wheel and other instruments which are being connected via wire ropes and cables to corresponding parts of the engine and propeller for the piloting of the aircraft. In this way, in emergency situations during the upright detachment of cabin 1, as shown in FIG. 1A, through opening 3 of fuselage 4, pedestal 3b which also moves upright in a downward direction along with attached fuselage 4, simultaneously slides and becomes detached from cabin 1 through opening 1e, while it automatically releases lid 1h which thereby seals wall 1g of opening 1e.

As shown in FIG. 2A the detachable separate control stick system 1k consists of two separate parts, an upper bar 1m and a lower bar 1m' connected through false linkage, also shown in FIGS. 2B, 2C.

Upper bar 1m is the one that always remains in the cockpit of cabin 1 and with its end 1n it penetrates opening 1o of the floor 1f (FIGS. 1A, 1B, 1E) while its lower end 1m is internally hollow like a tube. Lower bar 1m' is fixedly connected to structural members 3e of fuselage 4 and transmits the movements of the upper bar to the corresponding rudders of aircraft 5 (FIGS. 1B, 1E, 2C).

In FIG. 2C are illustrated in sectional view the matching end portions 1n', 1n of the lower and upper bars 1m' and 1m respectively.

The configuration of abovementioned end portions 1n and 1n' is such as to enable transmission in all directions of the movements of upper bar 1m to lower bar 1m'.

This is achieved in FIG. 2B with the configuration of ends 1n and 1n' in the form of a splined construction so that all movements forward-backwards-sideways are transmitted precisely from upper bar 1m to the attached lower bar 1m' and successively through wire ropes to the rudders of the aircraft. The splined construction achieves the insertion of the spline-like projections of the end of one bar to the corresponding slots of the end of the other bar.

During the detachment of upper bar 1m it will be held to place by safety pin 1j so that it will not be able to penetrate slot 1o but instead it will move vertically along with detachable cabin 1 and slide out of lower bar 1m' which is attached to it (FIG. 1E). Slot 1o as illustrated to FIGS. 1A, 1B, 1E will be provided with an elevated protective wall 1o' for the purpose of protecting from the intrusion of water, and here the aforementioned safety reasons for opening 1e when pedestal 3b is detached also apply.

FIGS. 3A, 3B show the attachment of the upper crank 1p of the separable crankshaft system to pedals 1r of floor 1f of cabin 1. In FIG. 3A pedals 1r are connected respectively to push-pull bars 1r' and transmit movement to the upper crank 1p which functions like a torque arm and transmits movement through a push-pull bar and wire ropes to the vertical rudder of the tail plane of aircraft 5.

In FIG. 3B bisectional crankshaft system 1p consists of two separate parts, an upper crank 1q and a lower crank 1q' connected with false linkage and thus they interact. Upper crank 1q is the one that is fixedly mounted in cabin 1 whereas its tubular portion 1s penetrates slot 1x in the floor 1f of cabin 1. End 1s is internally hollow like a tube. Lower crank 1q' is connected to the push-pull bar which holds it in place in a fuselage 4 and transmits movements from upper crank 1q to the rudder of aircraft 5.

In FIG. 3A, upper crank 1q has penetrated with its hollow end 1s the respective end 1s' of lower crank 1q', the separable crankshaft system being thereby assembled.

In FIG. 3B the two parts 1q and 1q' of separable crankshaft system 1p are illustrated disassembled where the configuration of penetrating ends 1s and 1s' is such that allows the transmission of movement to the left-right from upper crank 1q to the interactive lower crank 1q'. This is achieved, as shown in FIG. 3B, with the configuration of ends 1s and 1s' in the form of splined construction so as to transmit movement precisely and also to enable their detachment and their ability to be brought in sliding interaction. This splined construction achieves the insertion of spline-shaped projections of the end of one crank to the respective sockets of the end of the other crank. During the vertical separation of upper crank 1q, it will be held to place in the cabin by push-pull bars 1r' which are connected to it and thus it will move vertically along with cabin 1 while the connected ends 1s and 1s' slide one away from the other and hence upper crank 1q is detached from lower crank 1q'. Also, for safety reasons there will be an elevated protective inner wall 1x' to prevent water influx as the same conditions described hereinabove for pedestal 3b and bar 1k apply.

As shown in FIGS. 1A, 4A, 4B, 4C, the system of upright sliding bars comprises a pair of bars 1v, 1v' onto cabin 1 and a pair of bars 1t, 1t' onto fuselage 4 for the facilitation of the rapid vertical detachment of cabin 1 from the fuselage 4. Thus FIG. 4A shows two vertically oriented U shaped metal section bars of the system of vertical sliding bars.

Upright sliding bar 1t is smaller in dimensions than the other upright sliding bar 1v so that one bar penetrates the other and they slide, as shown in FIG. 4B.

In FIGS. 1A, 4C, upright sliding bar 1v is fixedly attached onto the front external surface of cockpit 11 of cabin 1, while bar 1v' is fixedly attached onto the respective rear surface of cabin 1.

In FIG. 1A, upright sliding bar 1t is fixedly attached on the fuselage and, more precisely, inside opening 3 at the front point 3*f*, while at the respective rear point 3*f'* upright sliding bar 1*t'* is fixedly attached.

In this way, when cabin 1 is inserted in opening 3 and comes into matching contact with it, upright sliding bars 1*v*, 1*v'* of cabin 1 slide into the respective upright sliding bars 1*t*, 1*t'* of opening 3.

Thus, the vertical sliding combination of cabin 1 is created with at least 3, or more, alignment points comprising upright sliding bars 1*v*, 1*v'* while center pedestal 3*b* lies between them, contributing to the alignment of cabin 1 for its rapid escape during its upright, vertical detachment while being assisted by the respective upright sliding bars 1*t* and 1*t'* at the front 3*f* and rear 3*r* points of opening 3 of fuselage 4 of aircraft 5.

It must be mentioned that the description of this invention was made with reference to illustrative embodiments to which it is not restricted.

Hence, any change or amendment in the embodiment described hereinabove, as long as they do not comprise a new inventive step, are considered part of the scope and aims of the herein described invention, as specified in the Claims attached herein.

The invention claimed is:

1. An aircraft with a detachable passenger escape cabin, comprising:
   i. an opening in the fuselage of said aircraft,
   ii. a cockpit inside said cabin,
   iii. a first through opening inside said cockpit of said cabin, between a pilot seat and a co-pilot seat of said aircraft,
   iv. said first through opening extending longitudinally across a cabin floor, with a configuration that includes an elevated wall extending circumferentially around said first through opening,
   v. a center pedestal fixedly mounted to a structural frame of said aircraft inside said opening in the fuselage of said aircraft,
   vi. said center pedestal bearing on the external upper portion; an engine control throttle, mixture and pitch levers, a fuel control, a fuel contents gauge and longitudinal balance wheel,
   vii. said engine control throttle, mixture and pitch levers, fuel control, fuel contents gauge and longitudinal balance wheel being connected via wires to respective elements for the piloting of said aircraft,
   vii. said center pedestal being capable to move vertically downwards together with the aircraft fuselage, sliding, inside said elevated wall and out through the lower part of said first through opening of said floor of said cabin in emergency conditions,
   ix. a lid attached longitudinally across said elevated wall internally on the top of said elevated wall,
   x. said lid being rotatable and under the strain of springs between two configurations:
      (1) in normal conditions, said lid seals the internal portion of said wall of said through opening while said center pedestal penetrates the lower external portion of said first through opening vertically and extends longitudinally across and inside said through opening while being in matching contact with said elevated wall circumferentially, with one side of said center pedestal in matching contact with said lid which is positioned at a downward angle while at the same time under the strain of said springs;
      (2) in emergency conditions, at the same time that said center pedestal moves vertically downwards together with the aircraft fuselage, said lid rotates, under the strain of said springs, upwards and seals the upper portion of said elevated wall internally, and
   xi. said cabin and the fuselage of said aircraft consisting of the following:
      (a) a detachable control stick system, consisting of an upper bar that always remains in the cockpit of said cabin, said upper bar connected to a lower bar through a second through opening in the cabin floor,
      (b) a separable crankshaft system for the detachment of pedals, consisting of an upper crank mounted in said cabin, said upper crank connected to a lower crank through a third opening in the cabin floor, and
      (c) a system of upright sliding bars between said cabin and said fuselage of said aircraft, aligned vertically, with the first sliding bars attached to said cabin, having corresponding second sliding bars attached to said fuselage of said aircraft, first and second sliding bars being engaged in contact restricting relative motion in all directions except the vertical in normal conditions.

2. An aircraft with a detachable passenger escape cabin as claimed in above claim 1, said upper bar of said detachable control stick system extending at an internally hollow tubular end with splined configuration, a safety pin laterally extending across said hollow tubular end above said splined configuration of said upper bar and said lower bar of said detachable control stick system extending at an externally splined end, wherein in normal conditions said upper bar is fixedly connected to said lower bar through engagement of said internally hollow tubular end with splined configuration of said upper bar with said externally splined end of said lower bar, whilst in emergency conditions said externally splined end of said lower bar moves upright and vertically downwards together with said fuselage through said second through opening in the cabin floor whereas said safety pin prevents said upper bar from passing through said second through opening thereby keeping said upper bar within the cockpit of said cabin, said second through opening having a configuration that includes an elevated wall extending circumferentially around said second through opening.

3. An aircraft with a detachable passenger escape cabin as claimed in above claim 1, said upper crank of said separable crankshaft system comprising a pair of push-pull bars connected to the pedals and extending at an internally hollow tubular end with splined configuration, said tubular end penetrating said third opening in the cabin floor and said lower crank of said separable crankshaft system extending at an externally splined end, wherein in normal conditions said upper crank is fixedly connected to said lower crank through engagement of said internally hollow tubular end with splined configuration of said upper crank with said externally splined end of said lower crank, whilst in emergency conditions said externally splined end of said lower crank moves upright and vertically downwards together with said fuselage through said third opening in the cabin floor whereas said pair of push-pull bars prevents said upper crank from passing through said third opening thereby keeping said upper crank within the cockpit of said cabin, said third opening having a configuration that includes an elevated wall extending circumferentially around said third opening.

4. An aircraft with a detachable passenger escape cabin as claimed in above claim 1, wherein in said system of upright sliding bars between said cabin and said fuselage of said aircraft said first sliding bars attached to said cabin and said second sliding bars attached to said fuselage are U shaped metal sections with the width of said first sliding bars being larger than that of said second sliding bars enabling insertion and sliding of said second sliding bars into said first sliding bars, said first sliding bars being vertically oriented and fixedly mounted onto the external front and rear portion of said cabin and said second sliding bars being vertically oriented and fixedly mounted at respective positions onto the external front and rear portion of said fuselage, wherein as soon as emergency conditions arise said second sliding bars move out of said first sliding bars guiding said fuselage to move upright and vertically downwards, in alignment with said cabin being detached thereof.

* * * * *